UNITED STATES PATENT OFFICE.

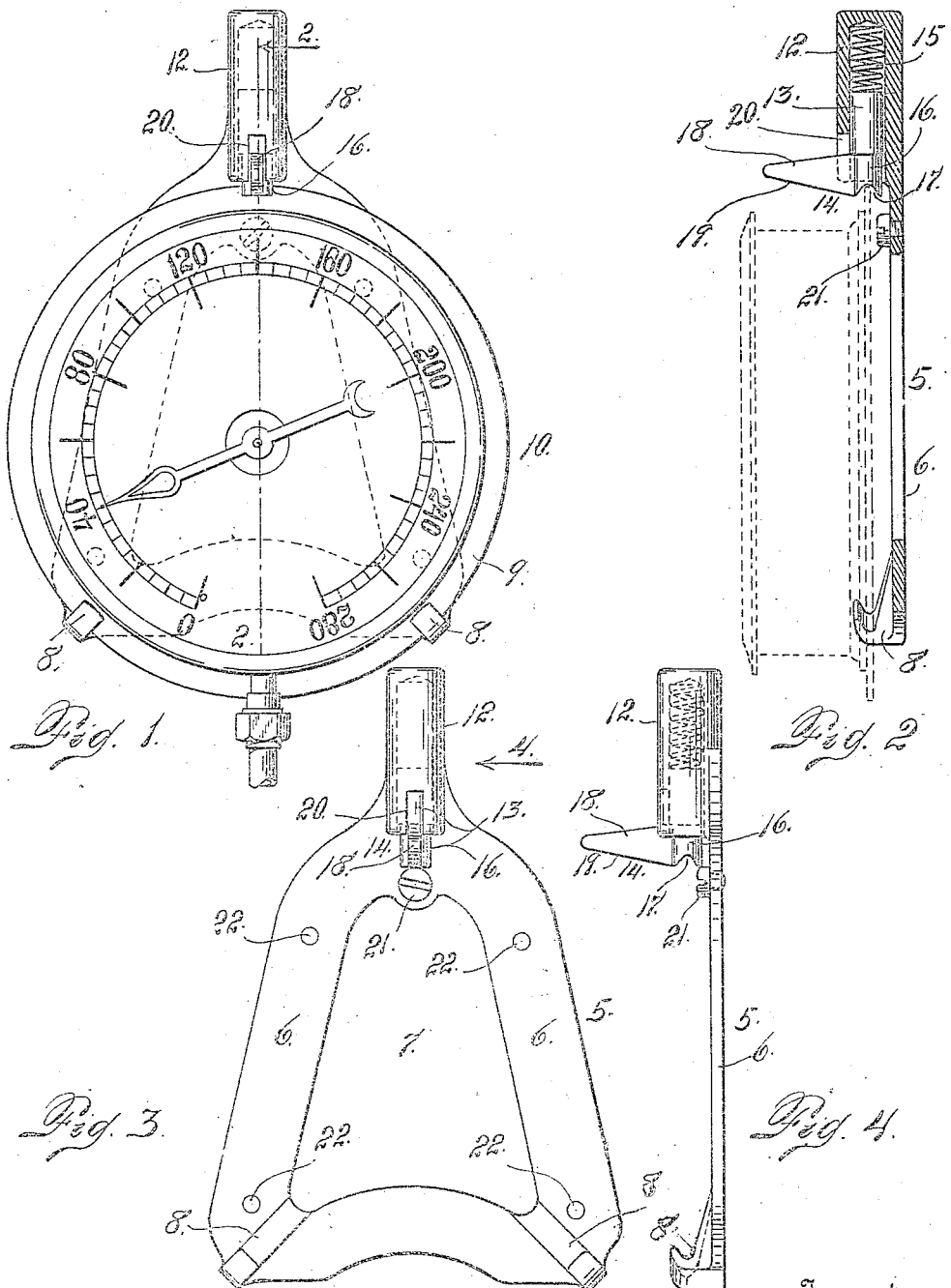

GEORGE EDWIN BAILIE, OF DENVER, COLORADO.

PRESSURE-GAGE HOLDER OR BRACKET.

1,049,974.　　　　Specification of Letters Patent.　　Patented Jan. 7, 1913.

Application filed April 1, 1912.　Serial No. 637,916.

*To all whom it may concern:*

Be it known that I, GEORGE E. BAILIE, citizen of the United States, residing in the city and county of Denver and State of Colorado, have invented certain new and useful Improvements in Pressure-Gage Holders or Brackets; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pressure-gage holders or brackets, my object being to provide a device adapted to securely hold a gage of this character against undue movement, but which shall at the same time have a limited degree of resilience to compensate for the expansion and contraction of the metals.

My present improvement is for the same purpose as the invention covered by my previous application filed July 10, 1911, allowed January 23, 1912, Serial No. 637,684. This improvement is a different specific construction of the generic invention covered by the claims of the aforesaid application.

While the invention is adapted for use in holding pressure gages of various kinds and in all the varied relations in which they are employed, it is more particularly adapted for use in holding the steam-gages of locomotive boilers, since there has been great difficulty heretofore in retaining these gages in place, due to the fact that it has been necessary to secure the gage to its bracket or plate by means of a number of screws which must be put in place every time the gage is applied and removed whenever it is detached. As the gage is so located that its securing by means of screws is quite difficult of accomplishment, it often happens that the full number of screws or other fastening device will not be employed, thus leaving the gage loose whereby it becomes injured due to the vibration to which it is subjected by the movement of the locomotive. Again, if the gage is held in place by metal parts without provision for resilience, there is another difficulty due to the fact that metals expand and contract as the temperature varies.

My improvement is intended to overcome all these difficulties and will now be explained in detail, reference being made to the accompanying drawing in which is illustrated an embodiment thereof.

In this drawing: Figure 1 is a front view of a gage mounted upon my improved holder or bracket, a part of the latter being indicated by dotted lines. Fig. 2 is a section taken through the holder on the line 2—2 Fig. 1, the gage being indicated by dotted lines. Fig. 3 is a front elevation of the holder shown in detail. Fig. 4 is a side or edge view of the same.

The same reference characters indicate the same parts in all the views.

Let the numeral 5 designate the bracket which, as illustrated in the drawing, has two arms 6 separated by a space 7, the arms diverging as they extend downwardly from their upper extremities where they merge. At the opposite lower corners of the bracket are located two rigid clips 8 which are hook-shaped to receive the edge of the rim 9 of the gage 10. Upon the upper extremity of the bracket is formed a tubular lug or pocket 12 which extends above the body of the bracket and is adapted to receive the plunger member 13 of an angle-clip 14. The upper member of this plunger member engages a spiral spring 15 located in the recess or cavity of the lug. The lower extremity 16 of the plunger normally extends below the lower extremity of the front part of the lug and has a V-shaped recess 17 adapted to receive the upper portion of the rim 9 of the gage when the latter is in place.

Extending forwardly from the lower extremity of the plunger-member is a guide-member 18 whose lower surface 19 is beveled upwardly as it extends forwardly. This guide-member 18 extends at right angles to the plunger-member, and its beveled lower surface forms a guide which is engaged by the rim of the gage as the latter is pushed into place. In applying the gage, it is only necessary to set the lower portion of its rim 9 into the hook-shaped extremities of the rigid clips 8, and then push the upper portion of the gage rearwardly. In this event, the upper part of the rim will engage the beveled lower surface 19 of the guide-member 18 of the resilient clip, and as force is applied to the gage in a rearward direction, the clip will move upwardly against the spring 15 sufficiently to allow the rim to slip into place directly below the plunger, after which the recoil of the spring will cause the lower extremity of the plunger containing the V-shaped recess to tightly engage the adjacent portion of the rim of the gage. The spring 15 is made of sufficient strength to retain the gage securely in place, while at the same time the clip has sufficient resilience or yielding capacity to compensate for expansion and contraction of the engaging metal parts without interfering in any way with the usefulness of the gage. The guide-member 18 of the spring clip passes through a slot 20 formed in the front wall of the pocket in which the plunger-member 13 is located. This slot forms a guide for the member 18 of the clip and prevents the latter from rotating in the pocket, thus maintaining this member in position at all times to perform its function. The slot 20 extends upwardly a sufficient distance above the guide-member 18 which is in contact with the gage, to allow the necessary upward movement of the clip during the insertion or removal of the gage. When the gage is not in place, the action of the spring 15 upon the plunger-member of the clip forces the latter downwardly and causes its lower V-shaped extremity to engage a stop-screw 21 inserted in the bracket and properly positioned for the purpose. When the clip is in engagement with this screw, the upper portion of the guide-member 18 is still within the lower portion of the slot 20, whereby the clip is prevented at all times from getting out of place.

From the foregoing description, the use of my improved pressure-gage holder or bracket will be readily understood. The bracket is provided with perforations 22 adapted to receive fastening devices as screws for securing the holder in proper position with relation to the boiler of the locomotive, or other engine or apparatus with which it is employed.

Assuming the holder is in place, in applying the gage it is only necessary to set its rim into the lower rigid clips 8 and then push the upper part of the gage rearwardly, whereby its rim is caused to engage the lower beveled surface of the guide-member 18 of the clip; as the rearward pressure is continued, the clip moves upwardly until the upper part of the rim is directly in line with the center of the plunger-member of the gage when the spring 15 moves the clip into locking relation with the rim of the gage.

Having thus described my invention, what I claim is:

1. A gage-holder comprising a bracket having a lug provided with a vertically disposed pocket opening downwardly, a plunger-clip slidable in said pocket and having a forwardly directed guide, beveled off upon its lower surface, a spring in the pocket acting on the clip, and means also mounted on the bracket and coöperating with the said clip for holding the gage in place.

2. The combination of a bracket equipped with a lug forwardly offset from the body of the bracket and longitudinally bored, a plunger slidable in said bore, a spring acting on the plunger, one extremity of the plunger being recessed to engage the rim of the gage, the lower portion of the plunger having a forwardly-directed guide-member having one surface beveled, the wall of the lug being slotted to receive the guide-member, the bracket being provided with a stop to limit the inward movement of the plunger, and means coöperating with the plunger to secure the gage in place, substantially as described.

3. A gage-holder comprising a bracket having a forwardly-offset lug longitudinally bored, a plunger slidable in said bore, a spiral spring located in said bore and acting on the plunger, the lower extremity of the plunger extending beyond the lug and having a V-shaped recess adapted to act on the edge of the gage, and means coöperating with the plunger to hold the gage in place, substantially as described.

In testimony whereof I affix my signature in presence of two witnesses.

GEORGE EDWIN BAILIE.

Witnesses:
A. J. O'BRIEN,
A. E. ADAMS.